(12) United States Patent
Davis et al.

(10) Patent No.: US 11,886,321 B2
(45) Date of Patent: Jan. 30, 2024

(54) SYSTEM AND METHOD FOR BIAS EVALUATION SCANNING AND MATURITY MODEL

(71) Applicant: JPMorgan Chase Bank, N.A., New York, NY (US)

(72) Inventors: Aquelah Davis, Chicago, IL (US); Iqbal M Khan, Glenview, IL (US); Edwin L Tate, Frankfort, IL (US); Paula Fetterman, Belleair, FL (US); Peter J Evans, Carrollton, TX (US); Stephanie M Cromuel, Tampa, FL (US); Sharon L Williams, Chicago, IL (US); Paroul Bhandari, Lutz, FL (US); Dillon W Sullivan, West Lafayette, IN (US); Nicoleta Mihai, Rolling Meadows, IL (US)

(73) Assignee: JPMORGAN CHASE BANK, N.A., New York, NY (US)

(*) Notice: Subject to any disclaimer, the term of this patent is extended or adjusted under 35 U.S.C. 154(b) by 256 days.

(21) Appl. No.: 17/444,789

(22) Filed: Aug. 10, 2021

(65) Prior Publication Data
US 2023/0053115 A1 Feb. 16, 2023

(51) Int. Cl.
G06F 9/44 (2018.01)
G06F 11/36 (2006.01)
G06N 20/00 (2019.01)

(52) U.S. Cl.
CPC ......... *G06F 11/3616* (2013.01); *G06N 20/00* (2019.01)

(58) Field of Classification Search
None
See application file for complete search history.

(56) References Cited

U.S. PATENT DOCUMENTS

| 2011/0066893 A1* | 3/2011 | Bassin | G06F 8/70 714/E11.217 |
|---|---|---|---|
| 2020/0082299 A1* | 3/2020 | Vasconcelos | G06N 20/00 |
| 2021/0112101 A1* | 4/2021 | Crabtree | H04L 63/1425 |

(Continued)

OTHER PUBLICATIONS

Coates et al. "An instrument to evaluate the maturity of bias governance capability in artificial intelligence projects" (Year: 2019).*

(Continued)

*Primary Examiner* — Insun Kang
(74) *Attorney, Agent, or Firm* — GREENBLUM & BERNSTEIN, P.L.C.

(57) ABSTRACT

A system and method for automatic coding out biases in applications, systems, and processes are disclosed. A processor operatively connected to a memory via a communication interface applies an intake process based on received inventory data to applications, systems, and processes and implements a machine learning model in response to applying the intake process. The processor also identifies areas of the potential bias data within the applications, systems, and processes by utilizing the machine learning model based on analyzing response data received during the intake process; generates output data that includes bias data and exceptions data identified for the applications, systems, and processes; and mitigates the bias data and exceptions data in response to the output data by implementing a mitigation process.

17 Claims, 13 Drawing Sheets

(56) References Cited

U.S. PATENT DOCUMENTS

2021/0174222 A1* 6/2021 Dodwell ............... G06F 16/285
2022/0012591 A1* 1/2022 Dalli ..................... G06N 3/082

OTHER PUBLICATIONS

Walter et al., "Designing a Maturity Model for a Distributed Software Organization. An Experience Report," arXiv (Year: 2019).*
Feldman et al. "End-To-End Bias Mitigation: Removing Gender Bias in Deep Learning," arXiv, Jun. 2021 (Year: 2021).*

* cited by examiner

FIG. 7B

SYSTEM AND METHOD FOR BIAS EVALUATION SCANNING AND MATURITY MODEL

TECHNICAL FIELD

This disclosure generally relates to bias evaluation scanning, and, more particularly, to methods and apparatuses for implementing a bias code scanning tool for automatic coding out biases in applications, systems, and processes.

BACKGROUND

The developments described in this section are known to the inventors. However, unless otherwise indicated, it should not be assumed that any of the developments described in this section qualify as prior art merely by virtue of their inclusion in this section, or that those developments are known to a person of ordinary skill in the art.

Today's technology workflows and products may include bias. Exemplary bias in technology workflows and products may include: i) self-driving vehicles—where vehicles ran over brown people because their skin tones were not programmed in; ii) mortgage bias—redlining (where redlining continues to this day in areas of Chicago, because the entire process—especially appraisals and intake—have continuous problems in the area of race and zip code); iii) business engagement can be subject to many exceptions and overrides that may be skewed towards or against groups based on subjective criteria, etc. The concern may be that even if the above-noted exemplary problems may not be specific to an organization, but may be problems that could occur within the organization if checks and balances in its technologies are not implemented to ensure that biases are not decision making factors.

Currently, no tools or frameworks exist that may be configured to code out bias in applications, systems, and processes. Thus, there is need to develop standards and frameworks that may safeguard technologies of an organization against bias in coding and development processes.

SUMMARY

The present disclosure, through one or more of its various aspects, embodiments, and/or specific features or sub-components, provides, among other features, various systems, servers, devices, methods, media, programs, and platforms for implementing a bias coding scanning tool/module for automatic coding out biases in applications, systems, and processes, but the disclosure is not limited thereto. For example, the present disclosure, through one or more of its various aspects, embodiments, and/or specific features or sub-components, provides, among other features, various systems, servers, devices, methods, media, programs, and platforms for developing standards and frameworks via a bias coding scanning tool/module and a maturity model to safeguard organizational technologies against bias in coding and development processes.

According to an aspect of the present disclosure, a method for coding out biases in applications, systems, and processes by utilizing one or more processors and one or more memories is disclosed. The method may include: applying an intake process based on received inventory data to applications, systems, and processes; implementing a machine learning model in response to applying the intake process; identifying areas of the potential bias data within the applications, systems, and processes by utilizing the machine learning model based on analyzing response data received during the intake process; generating output data that includes bias data and exceptions data identified for the applications, systems, and processes; and mitigating the bias data and exceptions data in response to the output data by implementing a mitigation process.

According to another aspect of the present disclosure, wherein the potential bias data may include conscious or unconscious decisions data during development of the applications, systems and processes based on a set of predefined criteria data, but the disclosure is not limited thereto.

According to a further aspect of the present disclosure, wherein the set of predefined criteria data may include one or more of the following data: race data, gender data, ability data, veterans' status data, language data, marital status data, zip code data, and location data, but the disclosure is not limited thereto.

According to yet another aspect of the present disclosure, wherein in implementing the machine learning model, the method may further include: generating algorithmic measurement data of biases in response to analyzing input data corresponding to the set of predefined criteria data; coding the algorithmic measurement data of the biases into a bias coding scanning tool; and scanning the coded algorithmic measurement data to identify the potential biases within the applications, systems, and processes.

According to another aspect of the present disclosure, wherein the intake process includes receiving the inventory data of a set of intake data and evaluation processes data corresponding to the application, systems, and processes within a plurality of organizations.

According to a further aspect of the present disclosure, wherein the machine learning model classifies each organization of the plurality of organizations into a level of maturity based on its ability to identify and mitigate biases in its applications, systems and processes.

According to yet another aspect of the present disclosure, the method may further include: certifying each application, system, and process within each organization of the plurality of organizations to a predefined level of maturity in relation to identified bias level and mitigation level corresponding to each of the application, the system, and the process.

According to another aspect of the present disclosure, a system for coding out biases in application, systems, and processes is disclosed. The system may include: a processor; and a memory operatively connected to the processor via a communication interface, wherein the memory stores computer readable instructions that, when executed by the processor, causes the processor to: apply an intake process based on received inventory data to applications, systems, and processes; implement a machine learning model in response to applying the intake process; identify areas of the potential bias data within the applications, systems, and processes by utilizing the machine learning model based on analyzing response data received during the intake process; generate output data that includes bias data and exceptions data identified for the applications, systems, and processes; and mitigate the bias data and exceptions data in response to the output data by implementing a mitigation process.

According to a further aspect of the present disclosure, wherein in implementing the machine learning model, the processor may be further configured to: generate algorithmic measurement data of biases in response to analyzing input data corresponding to the set of predefined criteria data; code the algorithmic measurement data of the biases into a bias coding scanning tool; and scan the coded algorithmic measurement data to identify the potential biases within the applications, systems, and processes.

According to another aspect of the present disclosure, wherein during the intake process, the processor may be further configured to receive the inventory data of a set of intake data and evaluation processes data corresponding to the application, systems, and processes within a plurality of organizations.

According to an additional aspect of the present disclosure, wherein the processor may be further configured to: certify each application, system, and process within each organization of the plurality of organizations to a predefined level of maturity in relation to identified bias level and mitigation level corresponding to each of the application, the system, and the process.

According to yet another aspect of the present disclosure, a non-transitory computer readable medium configured to store instructions for automatic coding out biases in applications, systems, and processes is disclosed. The instructions, when executed, may cause a processor to perform the following: applying an intake process based on received inventory data to applications, systems, and processes; implementing a machine learning model in response to applying the intake process; identifying areas of the potential bias data within the applications, systems, and processes by utilizing the machine learning model based on analyzing response data received during the intake process; generating output data that includes bias data and exceptions data identified for the applications, systems, and processes; and mitigating the bias data and exceptions data in response to the output data by implementing a mitigation process.

According to another aspect of the present disclosure, wherein in implementing the machine learning model, the instructions, when executed, may further cause the processor to perform the following: generating algorithmic measurement data of biases in response to analyzing input data corresponding to the set of predefined criteria data; coding the algorithmic measurement data of the biases into a bias coding scanning tool; and scanning the coded algorithmic measurement data to identify the potential biases within the applications, systems, and processes.

According to another aspect of the present disclosure, wherein during the intake process, the instructions, when executed, may cause the processor to receive the inventory data of a set of intake data and evaluation processes data corresponding to the application, systems, and processes within a plurality of organizations.

According to a further aspect of the present disclosure, wherein the machine learning model classifies each organization of the plurality of organizations into a level of maturity based on its ability to identify and mitigate biases in its applications, systems and processes, and the instructions, when executed, may cause the processor to certify each application, system, and process within each organization of the plurality of organizations to a predefined level of maturity in relation to identified bias level and mitigation level corresponding to each of the application, the system, and the process.

BRIEF DESCRIPTION OF THE DRAWINGS

The present disclosure is further described in the detailed description which follows, in reference to the noted plurality of drawings, by way of non-limiting examples of preferred embodiments of the present disclosure, in which like characters represent like elements throughout the several views of the drawings.

FIG. 7B illustrates an exemplary user interface displaying sensitive features selection page implemented by the bias code scanning module of FIG. 4 in accordance with an exemplary embodiment.

DETAILED DESCRIPTION

Figure 1:
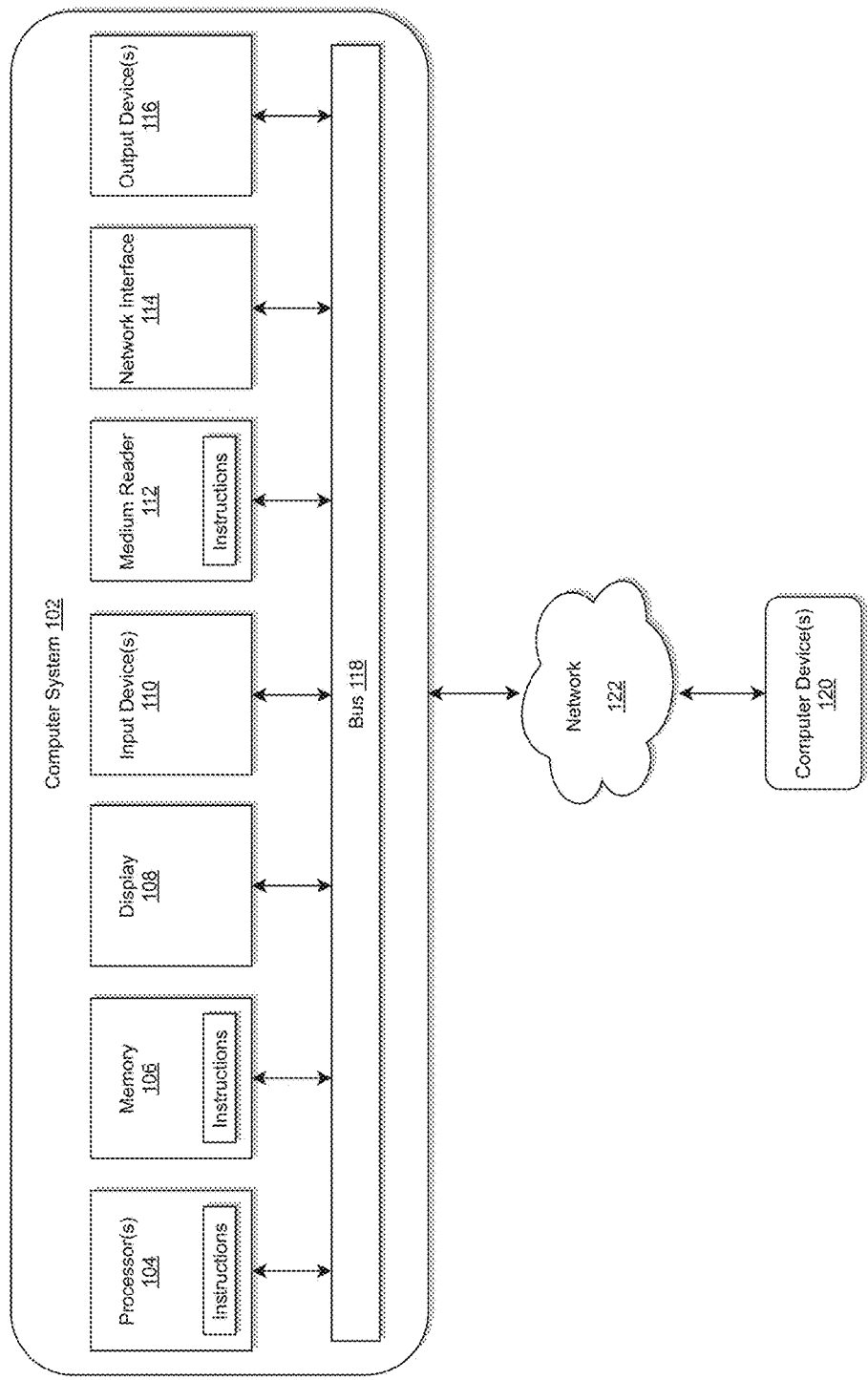
FIG. 1 illustrates a computer system for implementing a bias code scanning module for automatic coding out biases in applications, systems, and processes in accordance with an exemplary embodiment.

Through one or more of its various aspects, embodiments and/or specific features or sub-components of the present disclosure, are intended to bring out one or more of the advantages as specifically described above and noted below.

The examples may also be embodied as one or more non-transitory computer readable media having instructions stored thereon for one or more aspects of the present technology as described and illustrated by way of the examples herein. The instructions in some examples include executable code that, when executed by one or more processors, cause the processors to carry out steps necessary to implement the methods of the examples of this technology that are described and illustrated herein.

As is traditional in the field of the present disclosure, example embodiments are described, and illustrated in the drawings, in terms of functional blocks, units and/or modules. Those skilled in the art will appreciate that these blocks, units and/or modules are physically implemented by electronic (or optical) circuits such as logic circuits, discrete components, microprocessors, hard-wired circuits, memory elements, wiring connections, and the like, which may be formed using semiconductor-based fabrication techniques or other manufacturing technologies. In the case of the blocks, units and/or modules being implemented by microprocessors or similar, they may be programmed using software (e.g., microcode) to perform various functions discussed herein and may optionally be driven by firmware and/or software. Alternatively, each block, unit and/or module may be implemented by dedicated hardware, or as a combination of dedicated hardware to perform some functions and a processor (e.g., one or more programmed microprocessors and associated circuitry) to perform other functions. Also, each block, unit and/or module of the example embodiments may be physically separated into two or more interacting and discrete blocks, units and/or modules without departing from the scope of the inventive concepts. Further, the blocks, units and/or modules of the example embodiments may be physically combined into more complex blocks, units and/or modules without departing from the scope of the present disclosure.

FIG. 1 is an exemplary system for use in implementing a bias code scanning module for automatic coding out biases in applications, systems, and processes in accordance with the embodiments described herein. The system 100 is generally shown and may include a computer system 102, which is generally indicated.

The computer system 102 may include a set of instructions that can be executed to cause the computer system 102 to perform any one or more of the methods or computer-based functions disclosed herein, either alone or in combination with the other described devices. The computer system 102 may operate as a standalone device or may be connected to other systems or peripheral devices. For example, the computer system 102 may include, or be included within, any one or more computers, servers, systems, communication networks or cloud environment. Even further, the instructions may be operative in such cloud-based computing environment.

In a networked deployment, the computer system 102 may operate in the capacity of a server or as a client user computer in a server-client user network environment, a client user computer in a cloud computing environment, or as a peer computer system in a peer-to-peer (or distributed) network environment. The computer system 102, or portions thereof, may be implemented as, or incorporated into, various devices, such as a personal computer, a tablet computer, a set-top box, a personal digital assistant, a mobile device, a palmtop computer, a laptop computer, a desktop computer, a communications device, a wireless smart phone, a personal trusted device, a wearable device, a global positioning satellite (GPS) device, a web appliance, or any other machine capable of executing a set of instructions (sequential or otherwise) that specify actions to be taken by that machine. Further, while a single computer system 102 is illustrated, additional embodiments may include any collection of systems or sub-systems that individually or jointly execute instructions or perform functions. The term system shall be taken throughout the present disclosure to include any collection of systems or sub-systems that individually or jointly execute a set, or multiple sets, of instructions to perform one or more computer functions.

As illustrated in FIG. 1, the computer system 102 may include at least one processor 104. The processor 104 is tangible and non-transitory. As used herein, the term "non-transitory" is to be interpreted not as an eternal characteristic of a state, but as a characteristic of a state that will last for a period of time. The term "non-transitory" specifically disavows fleeting characteristics such as characteristics of a particular carrier wave or signal or other forms that exist only transitorily in any place at any time. The processor 104 is an article of manufacture and/or a machine component. The processor 104 is configured to execute software instructions in order to perform functions as described in the various embodiments herein. The processor 104 may be a general-purpose processor or may be part of an application specific integrated circuit (ASIC). The processor 104 may also be a microprocessor, a microcomputer, a processor chip, a controller, a microcontroller, a digital signal processor (DSP), a state machine, or a programmable logic device. The processor 104 may also be a logical circuit, including a programmable gate array (PGA) such as a field programmable gate array (FPGA), or another type of circuit that includes discrete gate and/or transistor logic. The processor 104 may be a central processing unit (CPU), a graphics processing unit (GPU), or both. Additionally, any processor described herein may include multiple processors, parallel processors, or both. Multiple processors may be included in, or coupled to, a single device or multiple devices.

The computer system 102 may also include a computer memory 106. The computer memory 106 may include a static memory, a dynamic memory, or both in communication. Memories described herein are tangible storage mediums that can store data and executable instructions, and are non-transitory during the time instructions are stored therein. Again, as used herein, the term "non-transitory" is to be interpreted not as an eternal characteristic of a state, but as a characteristic of a state that will last for a period of time. The term "non-transitory" specifically disavows fleeting characteristics such as characteristics of a particular carrier wave or signal or other forms that exist only transitorily in any place at any time. The memories are an article of manufacture and/or machine component. Memories described herein are computer-readable mediums from which data and executable instructions can be read by a computer. Memories as described herein may be random access memory (RAM), read only memory (ROM), flash memory, electrically programmable read only memory (EPROM), electrically erasable programmable read-only memory (EEPROM), registers, a hard disk, a cache, a removable disk, tape, compact disk read only memory (CD-ROM), digital versatile disk (DVD), floppy disk, blu-ray disk, or any other form of storage medium known in the art. Memories may be volatile or non-volatile, secure and/or encrypted, unsecure and/or unencrypted. Of course, the computer memory 106 may comprise any combination of memories or a single storage.

The computer system 102 may further include a display 108, such as a liquid crystal display (LCD), an organic light emitting diode (OLED), a flat panel display, a solid-state display, a cathode ray tube (CRT), a plasma display, or any other known display.

The computer system 102 may also include at least one input device 110, such as a keyboard, a touch-sensitive input screen or pad, a speech input, a mouse, a remote control device having a wireless keypad, a microphone coupled to a speech recognition engine, a camera such as a video camera or still camera, a cursor control device, a global positioning system (GPS) device, an altimeter, a gyroscope, an accelerometer, a proximity sensor, or any combination thereof. Those skilled in the art appreciate that various embodiments of the computer system 102 may include multiple input devices 110. Moreover, those skilled in the art further appreciate that the above-listed, exemplary input devices 110 are not meant to be exhaustive and that the computer system 102 may include any additional, or alternative, input devices 110.

The computer system 102 may also include a medium reader 112 which is configured to read any one or more sets of instructions, e.g., software, from any of the memories described herein. The instructions, when executed by a processor, can be used to perform one or more of the methods and processes as described herein. In a particular embodiment, the instructions may reside completely, or at least partially, within the memory 106, the medium reader 112, and/or the processor 110 during execution by the computer system 102.

Furthermore, the computer system 102 may include any additional devices, components, parts, peripherals, hardware, software or any combination thereof which are commonly known and understood as being included with or within a computer system, such as, but not limited to, a network interface 114 and an output device 116. The output device 116 may be, but is not limited to, a speaker, an audio out, a video out, a remote control output, a printer, or any combination thereof.

Each of the components of the computer system 102 may be interconnected and communicate via a bus 118 or other communication link. As shown in FIG. 1, the components may each be interconnected and communicate via an internal bus. However, those skilled in the art appreciate that any of the components may also be connected via an expansion bus. Moreover, the bus 118 may enable communication via any standard or other specification commonly known and understood such as, but not limited to, peripheral component interconnect, peripheral component interconnect express, parallel advanced technology attachment, serial advanced technology attachment, etc.

The computer system 102 may be in communication with one or more additional computer devices 120 via a network 122. The network 122 may be, but is not limited to, a local area network, a wide area network, the Internet, a telephony network, a short-range network, or any other network commonly known and understood in the art. The short-range network may include, for example, Bluetooth, Zigbee, infrared, near field communication, ultraband, or any combination thereof. Those skilled in the art appreciate that additional networks 122 which are known and understood may additionally or alternatively be used and that the exemplary networks 122 are not limiting or exhaustive. Also, while the network 122 is shown in FIG. 1 as a wireless network, those skilled in the art appreciate that the network 122 may also be a wired network.

The additional computer device 120 is shown in FIG. 1 as a personal computer. However, those skilled in the art appreciate that, in alternative embodiments of the present application, the computer device 120 may be a laptop computer, a tablet PC, a personal digital assistant, a mobile device, a palmtop computer, a desktop computer, a communications device, a wireless telephone, a personal trusted device, a web appliance, a server, or any other device that is capable of executing a set of instructions, sequential or otherwise, that specify actions to be taken by that device. Of course, those skilled in the art appreciate that the above-listed devices are merely exemplary devices and that the device 120 may be any additional device or apparatus commonly known and understood in the art without departing from the scope of the present application. For example, the computer device 120 may be the same or similar to the computer system 102. Furthermore, those skilled in the art similarly understand that the device may be any combination of devices and apparatuses.

Of course, those skilled in the art appreciate that the above-listed components of the computer system 102 are merely meant to be exemplary and are not intended to be exhaustive and/or inclusive. Furthermore, the examples of the components listed above are also meant to be exemplary and similarly are not meant to be exhaustive and/or inclusive.

In accordance with various embodiments of the present disclosure, the methods described herein may be implemented using a hardware computer system that executes software programs. Further, in an exemplary, non-limited embodiment, implementations can include distributed processing, component/object distributed processing, and an operation mode having parallel processing capabilities. Virtual computer system processing can be constructed to implement one or more of the methods or functionality as described herein, and a processor described herein may be used to support a virtual processing environment.

Figure 2:
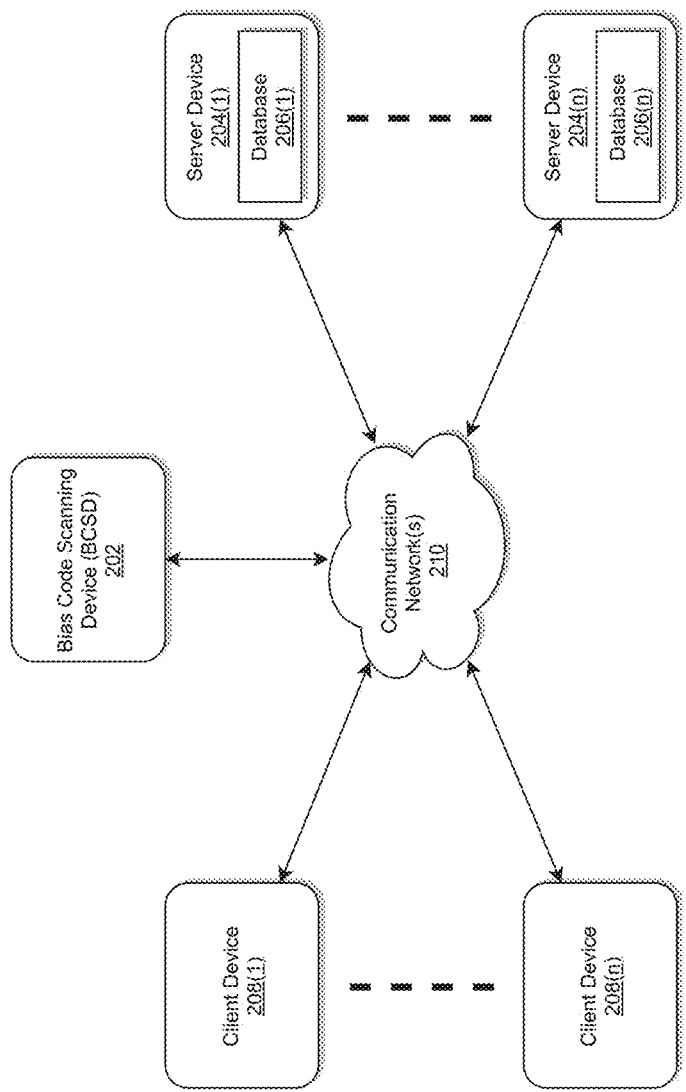
FIG. 2 illustrates an exemplary diagram of a network environment with a bias code scanning device in accordance with an exemplary embodiment.

Referring to FIG. 2, a schematic of an exemplary network environment 200 for implementing a bias code scanning device (BCSD) of the instant disclosure is illustrated.

According to exemplary embodiments, the above-described problems associated with conventional approach may be overcome by implementing a BCSD 202 as illustrated in FIG. 2 that may provide a platform for implementing a bias coding scanning tool/module for automatic coding out biases in applications, systems, and processes, but the disclosure is not limited thereto. For example, according to exemplary embodiments, the above-described problems associated with conventional approach may be overcome by implementing a BCSD 202 as illustrated in FIG. 2 that may provide a platform for developing standards and frameworks via a bias coding scanning tool/module and a maturity model to safeguard organizational technologies against bias in coding and development processes, but the disclosure is not limited thereto.

The BCSD 202 may be the same or similar to the computer system 102 as described with respect to FIG. 1.

The BCSD 202 may store one or more applications that can include executable instructions that, when executed by the BCSD 202, cause the BCSD 202 to perform actions, such as to transmit, receive, or otherwise process network messages, for example, and to perform other actions described and illustrated below with reference to the figures. The application(s) may be implemented as modules or components of other applications. Further, the application(s) can be implemented as operating system extensions, modules, plugins, or the like.

Even further, the application(s) may be operative in a cloud-based computing environment. The application(s) may be executed within or as virtual machine(s) or virtual server(s) that may be managed in a cloud-based computing environment. Also, the application(s), and even the BCSD 202 itself, may be located in virtual server(s) running in a cloud-based computing environment rather than being tied to one or more specific physical network computing devices. Also, the application(s) may be running in one or more virtual machines (VMs) executing on the BCSD 202. Additionally, in one or more embodiments of this technology, virtual machine(s) running on the BCSD 202 may be managed or supervised by a hypervisor.

In the network environment 200 of FIG. 2, the BCSD 202 is coupled to a plurality of server devices 204(1)-204(n) that hosts a plurality of databases 206(1)-206(n), and also to a plurality of client devices 208(1)-208(n) via communication network(s) 210. A communication interface of the BCSD 202, such as the network interface 114 of the computer system 102 of FIG. 1, operatively couples and communicates between the BCSD 202, the server devices 204(1)-204(n), and/or the client devices 208(1)-208(n), which are all coupled together by the communication network(s) 210, although other types and/or numbers of communication networks or systems with other types and/or numbers of connections and/or configurations to other devices and/or elements may also be used.

The communication network(s) 210 may be the same or similar to the network 122 as described with respect to FIG. 1, although the BCSD 202, the server devices 204(1)-204(n), and/or the client devices 208(1)-208(n) may be coupled together via other topologies. Additionally, the network environment 200 may include other network devices such as one or more routers and/or switches, for example, which are well known in the art and thus will not be described herein.

By way of example only, the communication network(s) 210 may include local area network(s) (LAN(s)) or wide area network(s) (WAN(s)), and can use TCP/IP over Ethernet and industry-standard protocols, although other types and/or numbers of protocols and/or communication networks may be used. The communication network(s) 202 in this example may employ any suitable interface mechanisms and network communication technologies including, for example, teletraffic in any suitable form (e.g., voice, modem, and the like), Public Switched Telephone Network (PSTNs), Ethernet-based Packet Data Networks (PDNs), combinations thereof, and the like.

The BCSD 202 may be a standalone device or integrated with one or more other devices or apparatuses, such as one or more of the server devices 204(1)-204(n), for example. In one particular example, the BCSD 202 may be hosted by one of the server devices 204(1)-204(n), and other arrangements are also possible. Moreover, one or more of the devices of the BCSD 202 may be in the same or a different communication network including one or more public, private, or cloud networks, for example.

The plurality of server devices 204(1)-204(n) may be the same or similar to the computer system 102 or the computer device 120 as described with respect to FIG. 1, including any features or combination of features described with respect thereto. For example, any of the server devices 204(1)-204(n) may include, among other features, one or more processors, a memory, and a communication interface, which are coupled together by a bus or other communication link, although other numbers and/or types of network devices may be used. The server devices 204(1)-204(n) in this example may process requests received from the BCSD 202 via the communication network(s) 210 according to the HTTP-based and/or JavaScript Object Notation (JSON) protocol, for example, although other protocols may also be used.

The server devices 204(1)-204(n) may be hardware or software or may represent a system with multiple servers in a pool, which may include internal or external networks. The server devices 204(1)-204(n) hosts the databases 206(1)-206(n) that are configured to store metadata sets, data quality rules, and newly generated data.

Although the server devices 204(1)-204(n) are illustrated as single devices, one or more actions of each of the server devices 204(1)-204(n) may be distributed across one or more distinct network computing devices that together comprise one or more of the server devices 204(1)-204(n). Moreover, the server devices 204(1)-204(n) are not limited to a particular configuration. Thus, the server devices 204(1)-204(n) may contain a plurality of network computing devices that operate using a master/slave approach, whereby one of the network computing devices of the server devices 204(1)-204(n) operates to manage and/or otherwise coordinate operations of the other network computing devices.

The server devices 204(1)-204(n) may operate as a plurality of network computing devices within a cluster architecture, a peer-to peer architecture, virtual machines, or within a cloud architecture, for example. Thus, the technology disclosed herein is not to be construed as being limited to a single environment and other configurations and architectures are also envisaged.

The plurality of client devices 208(1)-208(n) may also be the same or similar to the computer system 102 or the computer device 120 as described with respect to FIG. 1, including any features or combination of features described with respect thereto. Client device in this context refers to any computing device that interfaces to communications network(s) 210 to obtain resources from one or more server devices 204(1)-204(n) or other client devices 208(1)-208(n).

According to exemplary embodiments, the client devices 208(1)-208(n) in this example may include any type of computing device that can facilitate the implementation of the BCSD 202 that may provide a platform for implementing a bias coding scanning tool/module for automatic coding out biases in applications, systems, and processes, but the disclosure is not limited thereto. For example, according to exemplary embodiments, the client devices 208(1)-208(n) in this example may include any type of computing device that can facilitate the implementation of the BCSD 202 that may provide a platform for developing standards and frameworks via a bias coding scanning tool/module and a maturity model to safeguard organizational technologies against bias in coding and development processes, but the disclosure is not limited thereto.

The client devices 208(1)-208(n) may run interface applications, such as standard web browsers or standalone client applications, which may provide an interface to communicate with the BCSD 202 via the communication network(s) 210 in order to communicate user requests. The client devices 208(1)-208(n) may further include, among other features, a display device, such as a display screen or touchscreen, and/or an input device, such as a keyboard, for example.

Although the exemplary network environment 200 with the BCSD 202, the server devices 204(1)-204(n), the client devices 208(1)-208(n), and the communication network(s) 210 are described and illustrated herein, other types and/or numbers of systems, devices, components, and/or elements in other topologies may be used. It is to be understood that the systems of the examples described herein are for exemplary purposes, as many variations of the specific hardware and software used to implement the examples are possible, as will be appreciated by those skilled in the relevant art(s).

One or more of the devices depicted in the network environment 200, such as the BCSD 202, the server devices 204(1)-204(n), or the client devices 208(1)-208(n), for example, may be configured to operate as virtual instances on the same physical machine. For example, one or more of the BCSD 202, the server devices 204(1)-204(n), or the client devices 208(1)-208(n) may operate on the same physical device rather than as separate devices communicating through communication network(s) 210. Additionally, there may be more or fewer BCSDs 202, server devices 204(1)-204(n), or client devices 208(1)-208(n) than illustrated in FIG. 2. According to exemplary embodiments, the BCSD 202 may be configured to send code at run-time to remote server devices 204(1)-204(n), but the disclosure is not limited thereto.

In addition, two or more computing systems or devices may be substituted for any one of the systems or devices in any example. Accordingly, principles and advantages of distributed processing, such as redundancy and replication also may be implemented, as desired, to increase the robustness and performance of the devices and systems of the examples. The examples may also be implemented on computer system(s) that extend across any suitable network using any suitable interface mechanisms and traffic technologies, including by way of example only teletraffic in any suitable form (e.g., voice and modem), wireless traffic networks, cellular traffic networks, Packet Data Networks (PDNs), the Internet, intranets, and combinations thereof.

Figure 3:
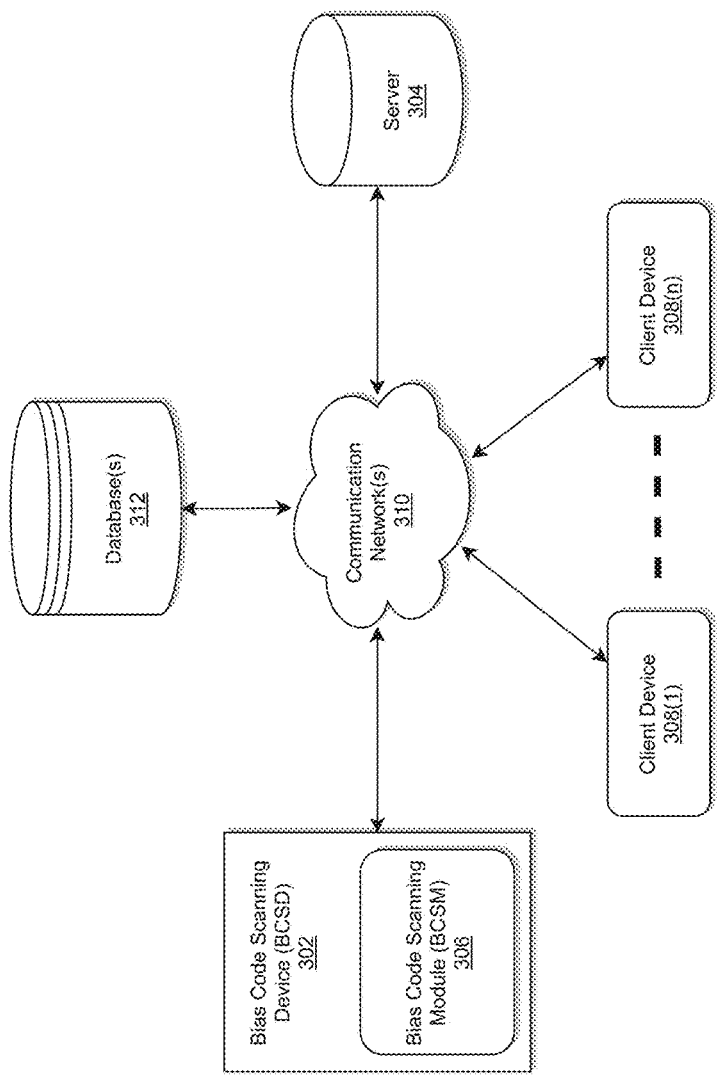
FIG. 3 illustrates a system diagram for implementing a bias code scanning device with a bias code scanning module in accordance with an exemplary embodiment.

FIG. 3 illustrates a system diagram for implementing a BCSD having a bias coding scanning module (BC SM) in accordance with an exemplary embodiment.

As illustrated in FIG. 3, the system 300 may include a BCSD 302 within which a BCSM 306 is embedded, a server 304, a database(s) 312, a plurality of client devices 308(1) . . . 308(n), and a communication network 310.

According to exemplary embodiments, the BCSD 302 including the BCSM 306 may be connected to the server 304, and the database(s) 312 via the communication network 310. Although there is only one database has been illustrated, the disclosure is not limited thereto. Any number of databases may be utilized. The BCSD 302 may also be connected to the plurality of client devices 308(1) . . . 308(n) via the communication network 310, but the disclosure is not limited thereto.

According to exemplary embodiment, the BCSD 302 is described and shown in FIG. 3 as including the BCSM 306, although it may include other rules, policies, modules, databases, or applications, for example. According to exemplary embodiments, the database(s) 312 may be embedded within the BCSD 302. According to exemplary embodiments, the database(s) 312 may be configured to store intake data associated with applications, systems, and processes for identifying bias, etc., but the disclosure is not limited thereto.

According to exemplary embodiments, the BCSM 306 may be configured to receive real-time feed of data from the plurality of client devices 308(1) . . . 308(n) via the communication network 310.

According to exemplary embodiments, as will be described below, the BCSM 306 may be configured to access the database 312 via a communication network to retrieve intake data; apply an intake process based on received inventory data to applications, systems, and processes; implement a machine learning model in response to applying the intake process; identify areas of the potential bias data within the applications, systems, and processes by utilizing the machine learning model based on analyzing response data received during the intake process; generate output data that includes bias data and exceptions data identified for the applications, systems, and processes; and mitigate the bias data and exceptions data in response to the output data by implementing a mitigation process, but the disclosure is not limited thereto.

The plurality of client devices 308(1) . . . 308(n) are illustrated as being in communication with the BCSD 302. In this regard, the plurality of client devices 308(1) . . . 308(n) may be "clients" of the BCSD 302 and are described herein as such. Nevertheless, it is to be known and understood that the plurality of client devices 308(1) . . . 308(n) need not necessarily be "clients" of the BCSD 302, or any entity described in association therewith herein. Any additional or alternative relationship may exist between either or both of the plurality of client devices 308(1) . . . 308(n) and the BCSD 302, or no relationship may exist.

The first client device 308(1) may be, for example, a smart phone. Of course, the first client device 308(1) may be any additional device described herein. The second client device 308(n) may be, for example, a personal computer (PC). Of course, the second client device 308(n) may also be any additional device described herein. According to exemplary embodiments, the server 304 may be the same or equivalent to the server device 204 as illustrated in FIG. 2.

The process may be executed via the communication network 310, which may comprise plural networks as described above. For example, in an exemplary embodiment, one or more of the plurality of client devices 308(1) . . . 308(n) may communicate with the BCSD 302 via broadband or cellular communication. Of course, these embodiments are merely exemplary and are not limiting or exhaustive.

The computing device 301 may be the same or similar to any one of the client devices 208(1)-208(n) as described with respect to FIG. 2, including any features or combination of features described with respect thereto. The BCSD 302 may be the same or similar to the BCSD 202 as described with respect to FIG. 2, including any features or combination of features described with respect thereto.

Figure 4:
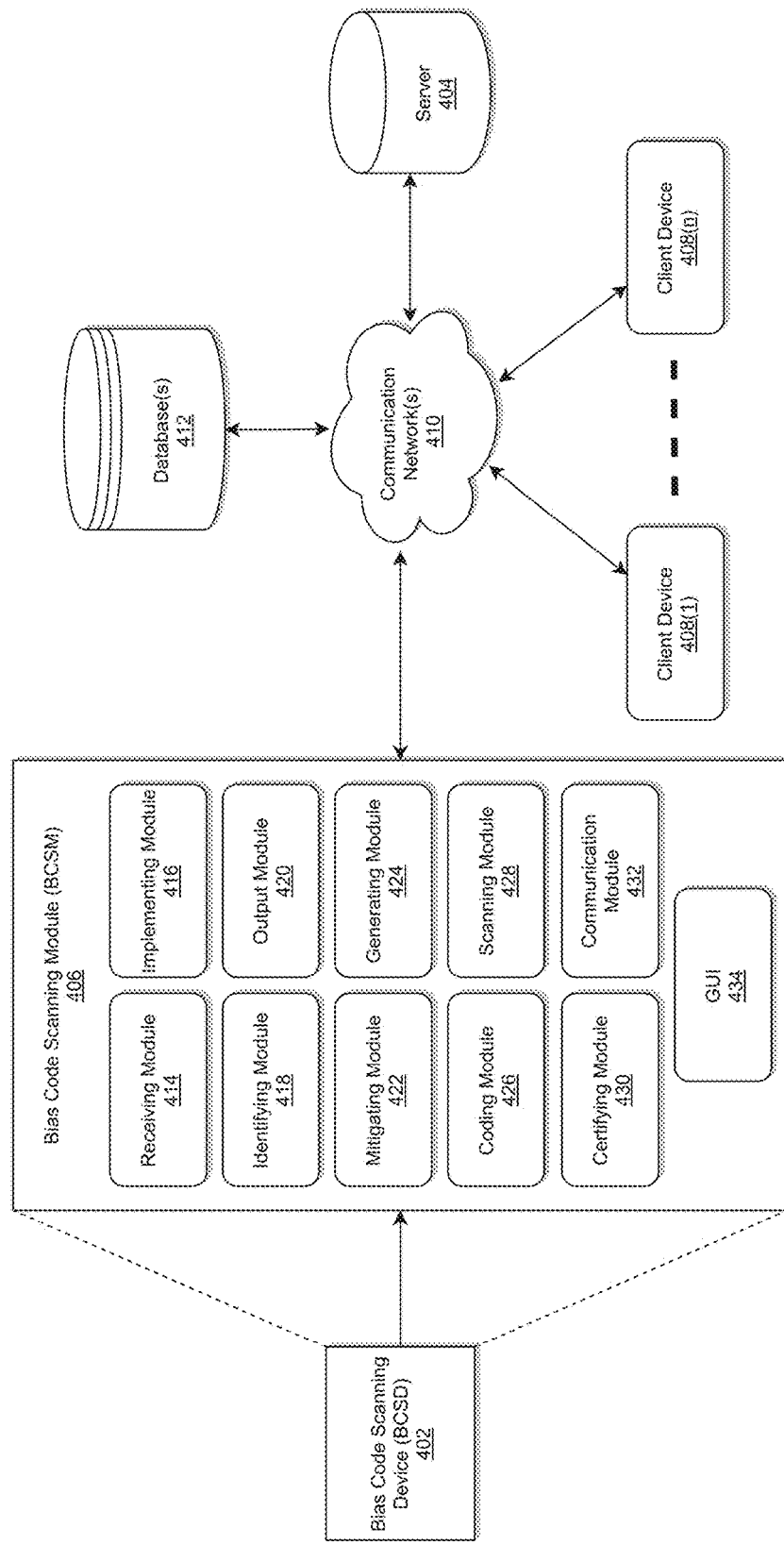
FIG. 4 illustrates a system diagram for implementing a bias code scanning module of FIG. 3 in accordance with an exemplary embodiment.

FIG. 4 illustrates a system diagram for implementing a bias code scanning module (BCSM) of FIG. 3 in accordance with an exemplary embodiment.

According to exemplary embodiments, the system 400 may include a bias code scanning device (BCSD) 402 within which a BCSM 406 is embedded, a server 404, a database(s) 412, and a communication network 410. According to exemplary embodiments, the BCSD 402 or the BCSM 406 may simply be referred to as a bias evaluation scanning tool (BEST) within departing from the scope of the present disclosure.

According to exemplary embodiments, the BCSD 402 including the BCSM 406 may be connected to the server 404, and the database(s) 412 via the communication network 410. The BCSD 402 may also be connected to the plurality of client devices 408(1) . . . 408(n) via the communication network 410, but the disclosure is not limited thereto. According to exemplary embodiments, the BCSD 402, the BCSM 406, the database(s) 412, the server 404, the client devices 408(1)-408(n), and the communication network 410 as illustrated in FIG. 4 may be the same or similar to the BCSD 302, the BCSM 306, the database(s) 312, the server 304, the client devices 308(1)-308(n), and the communication network 310, respectively, as illustrated in FIG. 3.

According to exemplary embodiments, as illustrated in FIG. 4, the BCSM 406 may include a receiving module 414, an implementing module 416, an identifying module 418, an output module 420, a mitigating module 422, a generating module 424, a coding module 426, a scanning module 428, a certifying module 430, a communication module 432, and a GUI 434.

The process may be executed via the communication module 432 and the communication network 410, which may comprise plural networks as described above. For example, in an exemplary embodiment, the various components of the BCSM 406 may communicate with the server 404, and the database(s) 412 via the communication module 432 and the communication network 410. Of course, these embodiments are merely exemplary and are not limiting or exhaustive.

According to exemplary embodiments, the communication network 410 and the communication module 432 may be configured to establish a link between the database(s) 412, the client devices 408(1)-408(n) and the BCSM 406.

According to exemplary embodiments, each of the receiving module 414, implementing module 416, identifying module 418, output module 420, mitigating module 422, generating module 424, coding module 426, scanning module 428, certifying module 430, and the communication module 432 may be implemented by microprocessors or similar, they may be programmed using software (e.g., microcode) to perform various functions discussed herein and may optionally be driven by firmware and/or software. Alternatively, each of the receiving module 414, implementing module 416, identifying module 418, output module 420, mitigating module 422, generating module 424, coding module 426, scanning module 428, certifying module 430, and the communication module 432 may be implemented by dedicated hardware, or as a combination of dedicated hardware to perform some functions and a processor (e.g., one or more programmed microprocessors and associated circuitry) to perform other functions. Also, according to exemplary embodiments, each of the receiving module 414, implementing module 416, identifying module 418, output module 420, mitigating module 422, generating module 424, coding module 426, scanning module 428, certifying module 430, and the communication module 432 may be physically separated into two or more interacting and discrete blocks, units, devices, and/or modules without departing from the scope of the inventive concepts.

According to exemplary embodiments, each of the receiving module 414, implementing module 416, identifying module 418, output module 420, mitigating module 422, generating module 424, coding module 426, scanning module 428, certifying module 430, and the communication module 432 of the BCSM 406 may be called by corresponding API, but the disclosure is not limited thereto.

Figure 5:
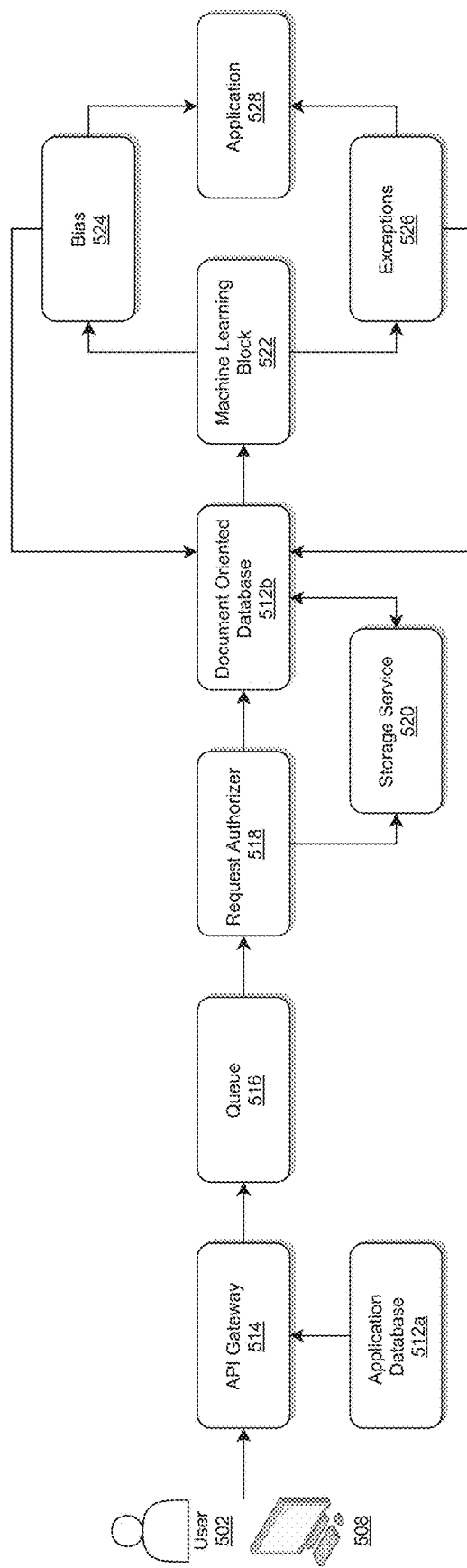
FIG. 5 illustrates an exemplary system architecture in accordance with an exemplary embodiment.

FIG. 5 illustrates an exemplary system architecture 500 in accordance with an exemplary embodiment.

According to exemplary embodiments, the exemplary system architecture 500 of FIG. 5 may include a computing device 508 utilized by a user 502. The computing device 508 may include a GUI (i.e., GUI 434 as illustrated in FIG. 4. FIG. 5 also illustrates an API gateway 514 operatively connected with a queue 516 and an application database 512a (i.e., Oracle Database). Input data may be received by the API gateway 514 from the computer device as the user 502 inputs data. The API gateway 514 also receives data from the application database 512a. The exemplary system architecture 500 of FIG. 5 may also include a queue 516, a request authorizer 518, a storage service 520, a document oriented database 512b, a machine learning block 522, and an application 528.

For example, according to exemplary embodiments, the user 502 may log in through the GUI 434 to a request message for bias evaluation and the application database 512a may route the request message through the API gateway 514. According to exemplary embodiments, the API gateway may be an Amazon API gateway, but the disclosure is not limited thereto.

A queue 516 may be operatively connected to the API gateway 514 and may route the request message to a request authorizer 518 which stores the information in a storage service 520 (i.e., an Amazon storage, but the disclosure is not limited thereto). According to exemplary embodiments, the request authorizer 518 may be a Lambda request authorizer, but the disclosure is not limited thereto. Any other desired request authorizer may be utilized without departing from the scope of the present disclosure.

According to exemplary embodiments, the request authorizer 518 may also route the request to a document oriented database 512b where the core machine learning capabilities of the BCSM 406 are housed. According to exemplary embodiments, the document oriented database 512b may be a Mongo database, but the disclosure is not limited thereto. Any other desired document oriented database may be utilized without departing from the scope of the present disclosure.

The BCSM 406 may run its analytics and may provide two outcomes—bias 524 and exceptions 526. The outcomes are both sent to an application 528 to take necessary actions and fed back to the system (i.e., the BCSM's core machine learning feature; the machine learning block 522) to educate it for better performance.

Figure 6:
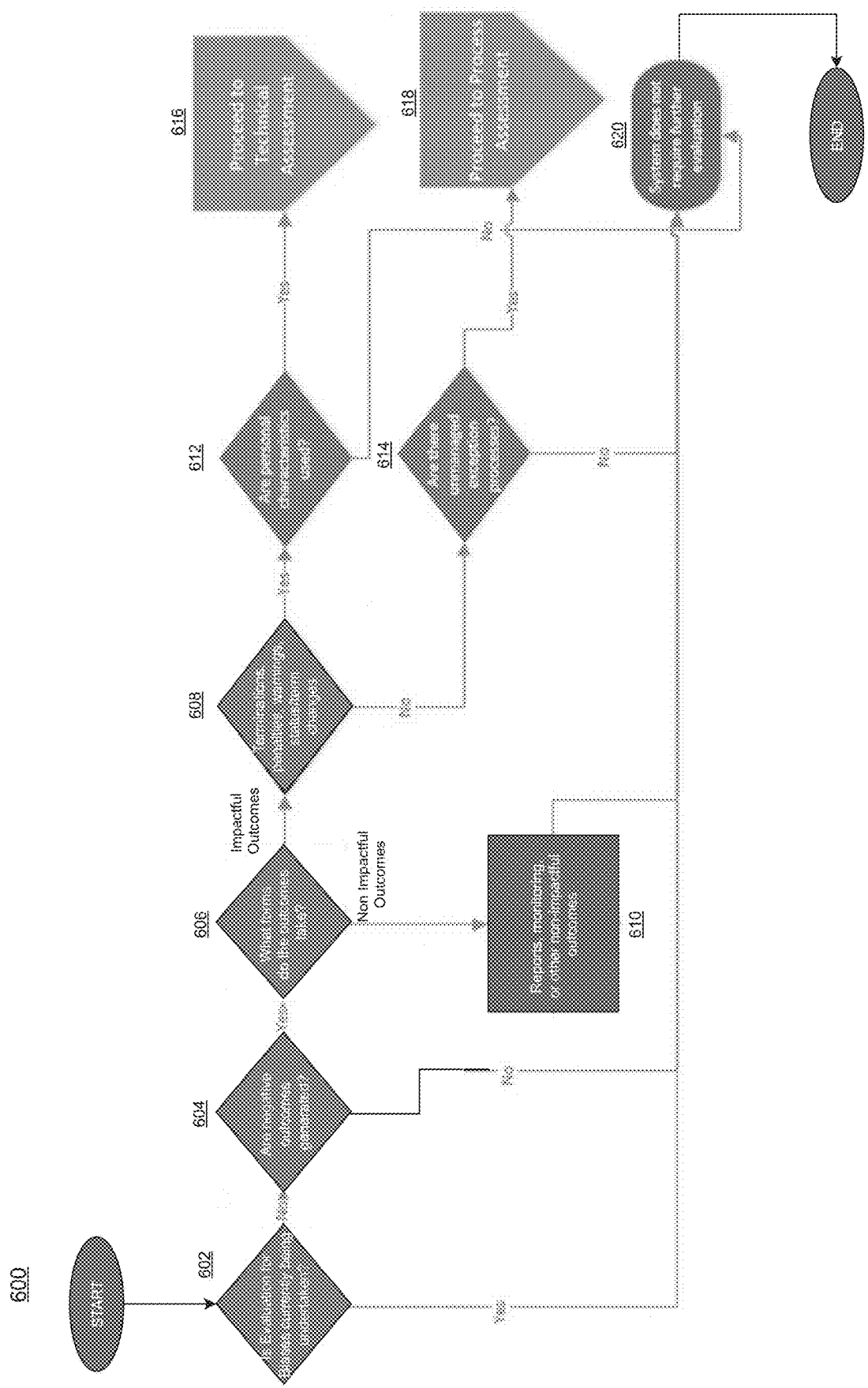
FIG. 6 illustrates an exemplary intake process implemented by the bias code scanning module of FIG. 4 in accordance with an exemplary embodiment.

FIG. 6 illustrates an exemplary intake process 600 implemented by the BCSM 406 of FIG. 4 in accordance with an exemplary embodiment.

According to exemplary embodiments, the intake process 600 may include a six-step questionnaire to identify appropriate candidates for the evaluation and tool scanning, but the disclosure is not limited thereto. Any desired number of questionnaire may be utilized to identify appropriate candidates for the evaluation and tool scanning without departing from the scope of the present disclosure.

According to exemplary embodiments, the six-step questionnaire may include, e.g., what inputs or requirements (i.e., requirements to identify or reduce or eliminate risk of account delinquencies and overages, etc.) involve decisions that can generate negative outcomes for customers or clients of an organization? Are potential biases being evaluated in the organization's applications or systems or processes today? What outcomes are generated that could be perceived as negative by the customers or clients of the organization (i.e., terminations, penalties, warnings, changes in terms, changes in status, etc.)? What forms do the outcomes take (i.e., reports, decisions, actions, etc.)? What personal characteristics are utilized for outcomes in the application or system or process (i.e., zip code, language, etc.)? What exceptions (if any) to the application workflow exist (i.e., manual overrides, decisions to create a case, etc.)?

According to exemplary embodiments, step 602 of the intake process 600 may include determining by the BCSM 406 whether evaluation for biases currently being undertaken or not for an application or system or process. If at step 602 the BCSM 406 determines that biases are currently being undertaken a desired application or system or process, the BCSM 406 does not require further evaluation at step 620.

However, according to exemplary embodiments, if at step 602 the BCSM 406 determines that biases are not currently being undertaken for a desired application or system or process, the BCSM 406, at step 604, may further determine whether negative outcomes are being generated by the application or system or process. If it is determined that no negative outcomes are generated by the application or system or process at step 604, the BCSM 406, at step 620, does not require further evaluation. If it is determined that negative outcomes are generated by the application or system or process at step 604, the BCSM 406, at step 606, may further inquire what forms the outcomes take.

For example, at step 608, the BCSM 406 may further determine whether the forms of outcomes include one or more of the following: terminations, penalties, warnings, status/term changes.

According to exemplary embodiments, if at step 608 the BCSM 406 determines that the forms of outcomes include one or more of the following, e.g., terminations, penalties, warnings, status/term changes, the BCSM 406, at step 612, may further determine if there are any personal characteristics used. If at step 612 the BCSM 406 determines that there are no personal characteristics used, the BCSM 406, at step 620, does not require further evaluation. However, if at step 612 the BCSM 406 determines that personal characteristics are used, the BCSM 406 proceed to technical assessment at step 616.

According to exemplary embodiments, the technical assessment at step 616 may include the following steps to assess whether there are technical aspects of the application that may be open to biases: inventory the algorithms used in the application; and inventory the data used within the application, but the disclosure is not limited thereto. According to exemplary embodiments, the inventory the data used within the application may include the following steps: evaluate the algorithms for use of personal characteristics (race data, gender data, ability data, veterans' status data, language data, marital status data, zip code data, or location data); compare the data types used within the application against the personal characteristics data types (race data, gender data, ability data, veterans' status data, language data, marital status data, zip code data, or location data); where personal characteristics data is found to be used as part of the application algorithms and/or data types, proceed with configuration and running of the BEST tool to scan for biases in handling of data; report on results and develop recommendations for improvement and remediation based on outputs from the BEST tool, but the disclosure is not limited thereto.

According to exemplary embodiments, if at step 608 the BCSM 406 determines that the forms of outcomes do not include one or more of the following, e.g., terminations, penalties, warnings, status/term changes, the BCSM 406 may further determine if there are unmanaged exception processes at step 614. If at step 614 the BCSM 406 determines that there are no unmanaged exception processes, the BCSM 406 does not require further evaluation at step 620. However, if at step 614 the BCSM 406 determines that there are unmanaged exception processes, the BCSM 406 proceed to process assessment at step 618.

According to exemplary embodiments, the process assessment at step 618 may include the following steps to assess whether there are processes in the target application that may be open to biases: inventory the processes the application is used with; identify areas where exceptions occur to using the application, or how the application is used; assess exceptions for potential use of personal characteristics; report on results of assessment and develop recommendations for improvement and remediation based on assessment; and use assessment results to tag application exception locations in the BEST tool for further evaluation and scanning, but the disclosure is not limited thereto.

On the other hand, at step 610, if it is determined that forms of outcomes include one or more of the following, e.g., reports, monitoring, or other non-impactful outcomes, the BCSM 406 does not require further evaluation at step 620.

Referring to FIGS. 4-6, according to exemplary embodiments, the receiving module 414 may be configured to apply an intake process (e.g., the intake process 600 as illustrated in FIG. 6) based on received inventory data to applications, systems, and processes;

According to exemplary embodiments, the implanting module 416 may be configured to implement a machine learning model in response to applying the intake process.

According to exemplary embodiments, the identifying module 418 may be configured to identify areas of the potential bias data within the applications, systems, and processes by utilizing the machine learning model based on analyzing response data received during the intake process.

According to exemplary embodiments, the output module may be configured to generate output data that includes bias data (e.g., bias 524 as illustrated in FIG. 5) and exceptions data (e.g., exceptions 526 as illustrated in FIG. 5) identified for the applications, systems, and processes According to exemplary embodiments, the mitigating module 422 may be configured to mitigate the bias data and exceptions data in response to the output data by implementing a mitigation process.

According to exemplary embodiments, the potential bias data may include conscious or unconscious decisions data during development of the applications, systems and processes based on a set of predefined criteria data, but the disclosure is not limited thereto.

According to exemplary embodiments, wherein the set of predefined criteria data may include one or more of the following data: race data, gender data, ability data, veterans' status data, language data, marital status data, zip code data, and location data, but the disclosure is not limited thereto.

Figure 7A:
FIG. 7A illustrates an exemplary user interface of a bias evaluation scanning tool implemented by the bias code scanning module of FIG. 4 in accordance with an exemplary embodiment.

For example, according to exemplary embodiments, FIG. 7A illustrates an exemplary user interface 700a of a bias evaluation scanning tool (BEST) implemented by the BCSM 406 of FIG. 4 in accordance with an exemplary embodiment. As illustrated in FIG. 7A, the BEST includes a "Get started" icon or button 702a to start the process of assessing the performance and fairness of applications, systems, processes, and tools.

Figure 7B:
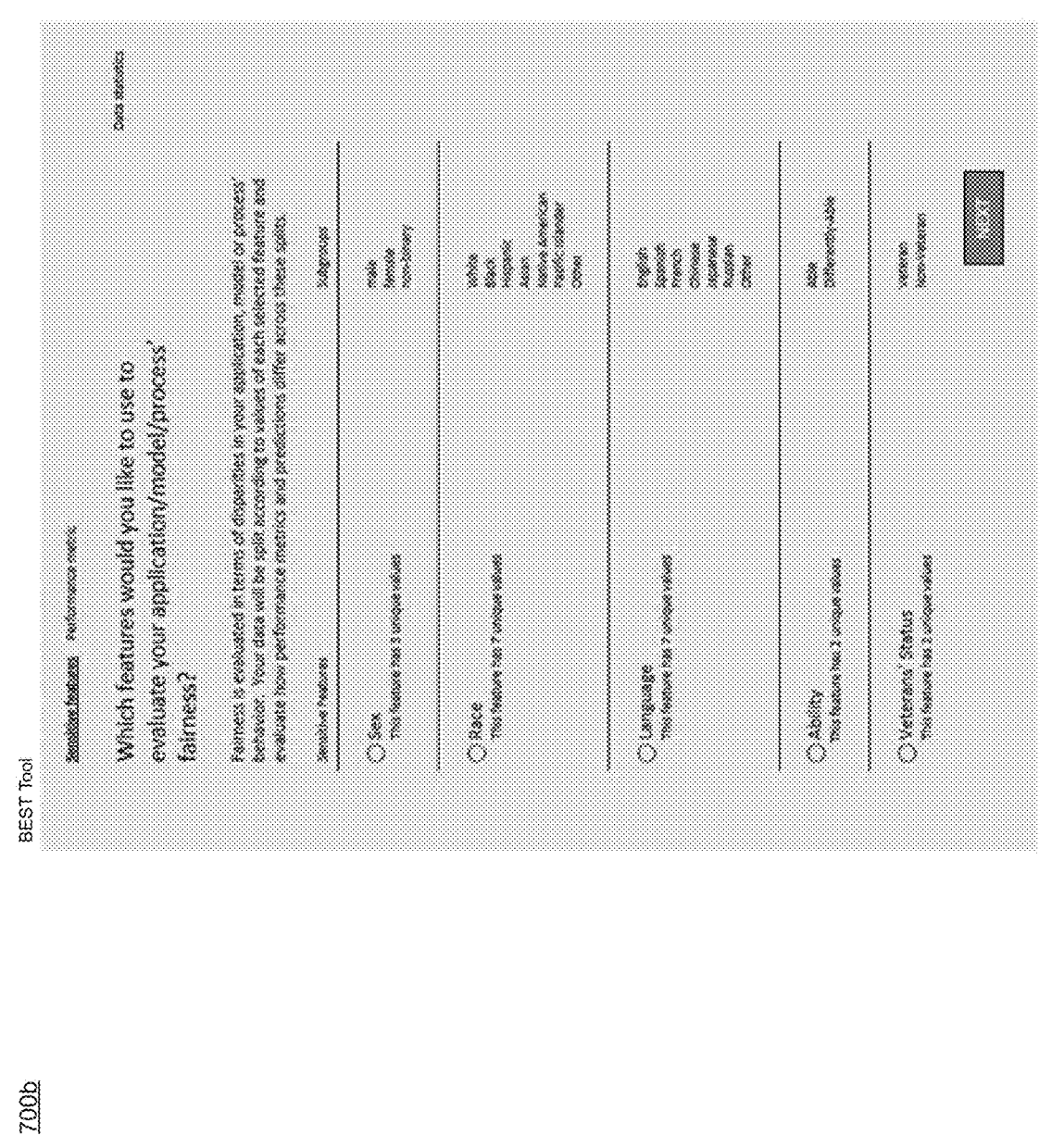

According to exemplary embodiments, FIG. 7B illustrates an exemplary user interface 700b displaying sensitive features selection page implemented by the BCSM 406 of FIG. 4 in accordance with an exemplary embodiment. A user 502 can select which features (e.g., sex, race, language, ability, Veterans' status, etc.) to be used for evaluating fairness in applications, systems, processes, tools, or models.

Figure 7C:
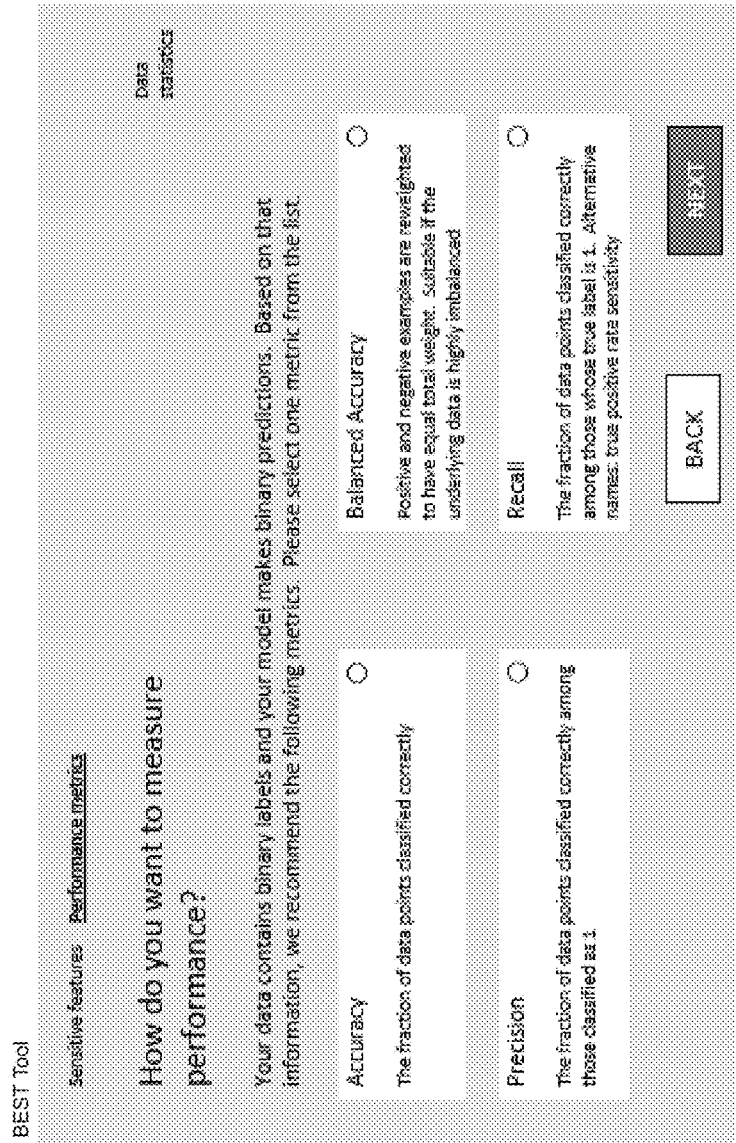
FIG. 7C illustrates an exemplary user interface displaying performance metrics selection page implemented by the bias code scanning module of FIG. 4 in accordance with an exemplary embodiment.
Figure 7D:
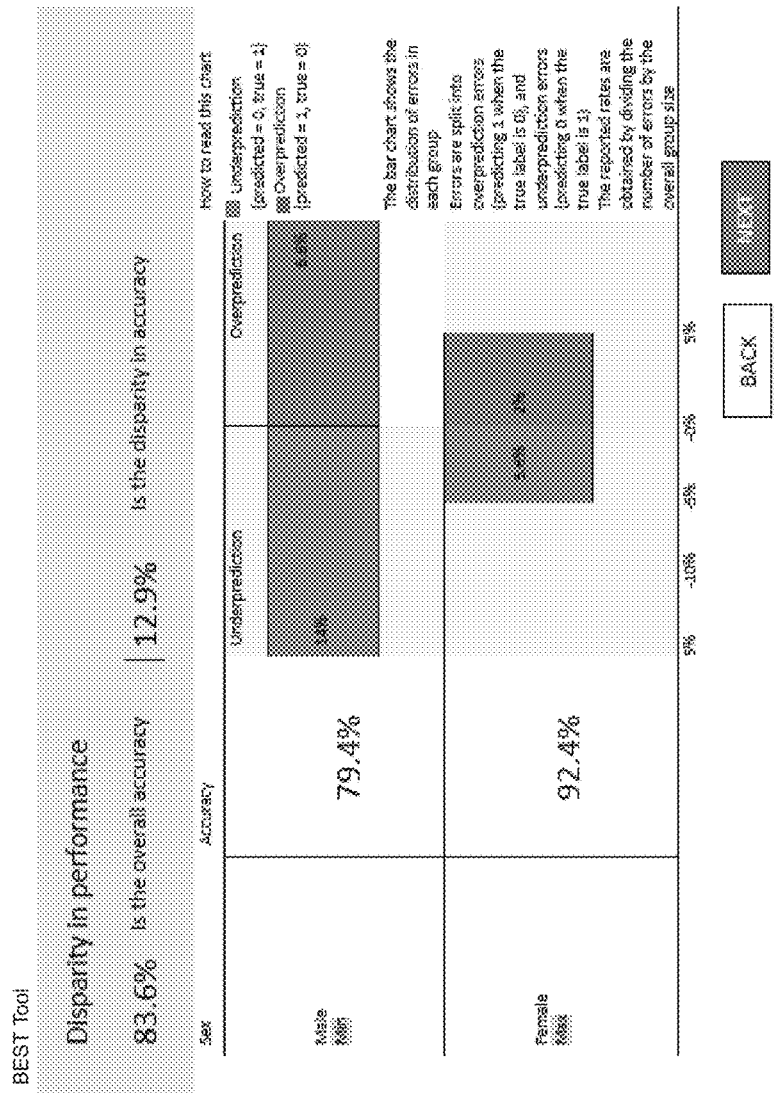
FIG. 7D illustrates an exemplary user interface displaying disparity in performance results page implemented by the bias code scanning module of FIG. 4 in accordance with an exemplary embodiment.
Figure 7E:
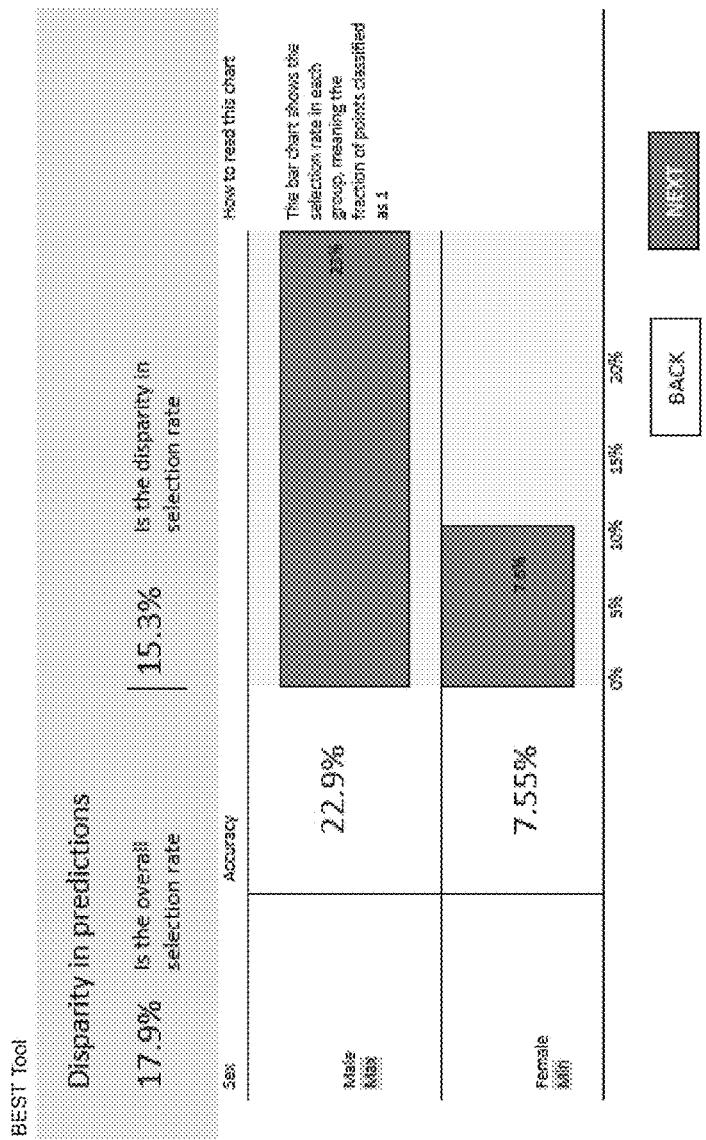
FIG. 7E illustrates an exemplary user interface displaying disparity in predictions results page implemented by the bias code scanning module of FIG. 4 in accordance with an exemplary embodiment.
Figure 7F:
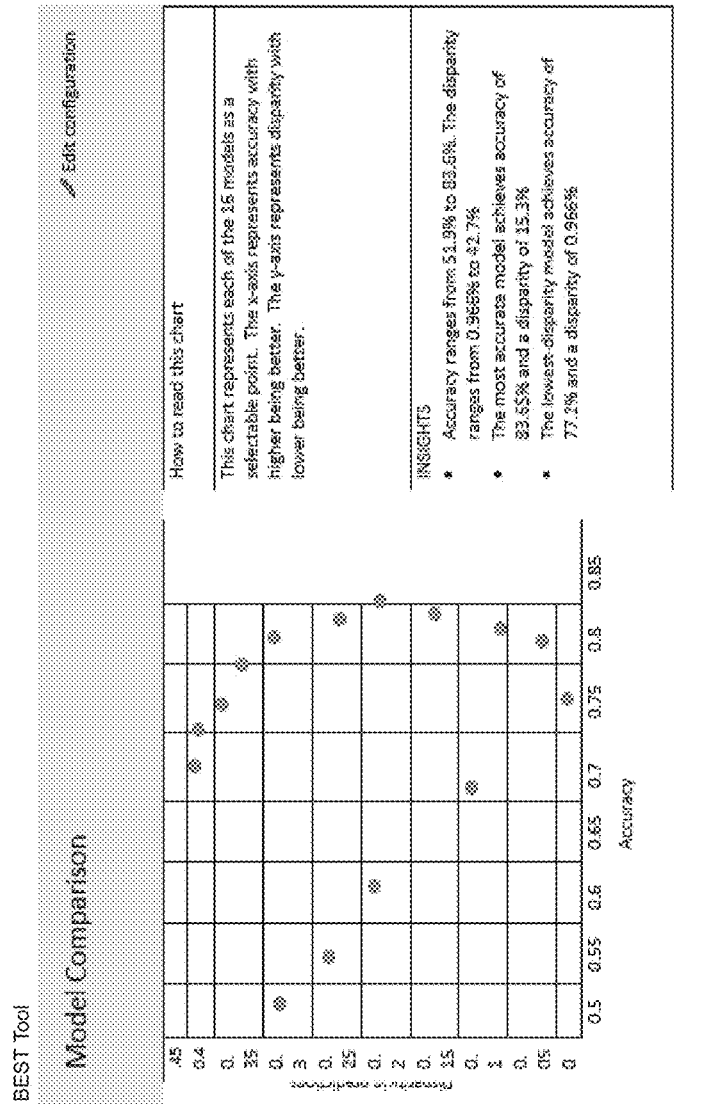
FIG. 7F illustrates an exemplary user interface displaying model comparison page implemented by the bias code scanning module of FIG. 4 in accordance with an exemplary embodiment.

FIG. 7C illustrates an exemplary user interface 700c displaying performance metrics selection page implemented by the BCSM 406 of FIG. 4 in accordance with an exemplary embodiment. FIG. 7D illustrates an exemplary user interface 700d displaying disparity in performance results page implemented by the BCSM 406 of FIG. 4 in accordance with an exemplary embodiment. FIG. 7E illustrates an exemplary user interface 700e displaying disparity in predictions results page implemented by the BCSM 406 of FIG. 4 in accordance with an exemplary embodiment. FIG. 7F illustrates an exemplary user interface 700f displaying model comparison page implemented by the BCSM 406 of FIG. 4 in accordance with an exemplary embodiment.

Referring back to FIGS. 4-6, according to exemplary embodiments, in implementing the machine learning model, the generating module 424 may be configured to generate algorithmic measurement data of biases in response to analyzing input data corresponding to the set of predefined criteria data. The coding module 426 may be configured to code the algorithmic measurement data of the biases into a bias coding scanning tool and the scanning module 428 may be configured to scan the coded algorithmic measurement data to identify the potential biases within the applications, systems, and processes.

According to exemplary embodiments, the intake process may include receiving the inventory data of a set of intake data and evaluation processes data corresponding to the application, systems, and processes within a plurality of organizations (e.g., the intake process 600 as illustrated in FIG. 6).

According to exemplary embodiments, the machine learning model classifies each organization of the plurality of organizations into a level of maturity based on its ability to identify and mitigate biases in its applications, systems and processes.

For example, according to exemplary embodiments, the method may further include: certifying each application, system, and process within each organization of the plurality of organizations to a predefined level of maturity in relation to identified bias level and mitigation level corresponding to each of the application, the system, and the process.

For example, according to exemplary embodiments four different maturity levels may be implemented including Level 1, Level 2, Level 3, and Level 4, but the disclosure is not limited thereto. These maturity levels may represent the maturity of an application or system or process in relation to recognition of potential biases that can become a part of those applications or systems or processes if left unchecked. According to exemplary embodiments, Level 1 maturity may indicate little to no maturity—no scanning and/or ad hoc (if any) understanding of presence of bias. Level 1 organizations have minimal if any recognition or assessment processes to identify biases in their applications, systems and processes. Level 2 maturity may indicate basic maturity—leveraging the framework and/or BEST tool to understand presence of bias. Level 2 organizations have a level of maturity in recognizing and evaluating their applications, systems and processes for biases. Level 3 maturity may indicate advanced maturity—understands presence of bias, utilizes framework and tool. Level 3 organizations have an advanced level of maturity in evaluating and identifying biases in their applications, systems and processes. Level 4 maturity may indicate fully mature—proactive, automated process and full framework utilization to identify biases. Level 4 organizations have the ability to perform full, automated bias scanning of their applications, systems and processes and do so across functions such as Risk, Technology, etc. They can be 'certified' as bias-free if the outcomes of their scanning and evaluations determine there are no biases.

According to exemplary embodiments, in evaluation of outcomes, the BCSM 406 may implement logarithms that can be defined at a high level as follows: where negative outcomes exist; and personal criteria is used; calculate the prevalence of negative outcomes by personal criteria; comparing against prevalence of personal criteria; comparing against prevalence of negative outcomes; and equals bias indicator.

According to exemplary embodiments, negative outcomes may refer to results of applications, systems or processes that can negatively impact a customer population; personal criteria may include examples include race, gender, ability, language, zip code; prevalence may indicate the numerical occurrence of a set of criteria; and bias indicator may refer to the result of examining the occurrence of outcomes by personal criteria.

Figure 8:
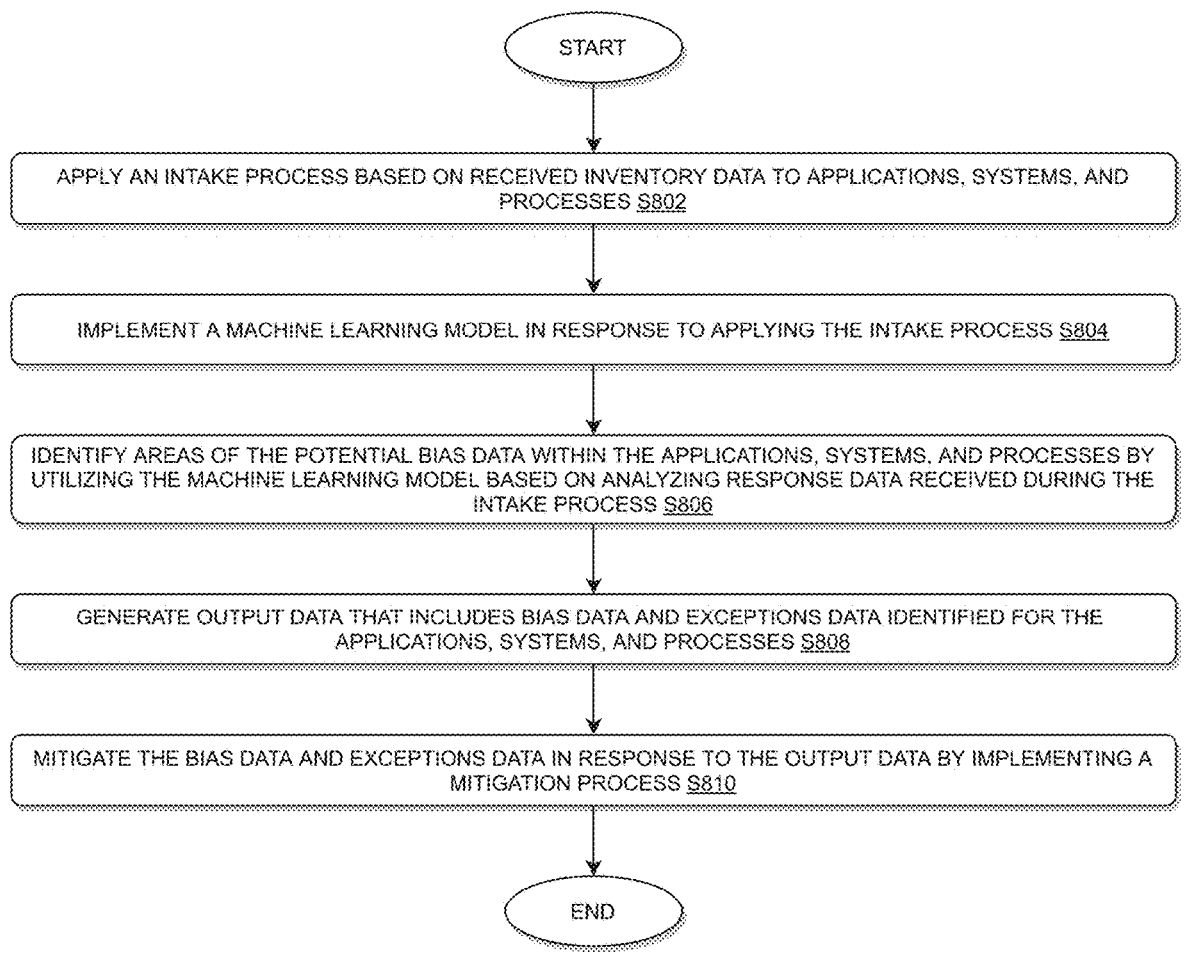
FIG. 8 illustrates an exemplary flow chart of implementing a bias code scanning module for automatic coding out biases in applications, systems, and processes in accordance with an exemplary embodiment.

FIG. 8 illustrates a flow chart of a process 800 implemented by the BCSM 406 of FIG. 4 for a coding out biases in applications, systems, and processes in accordance with an exemplary embodiment. It will be appreciated that the illustrated process 800 and associated steps may be performed in a different order, with illustrated steps omitted, with additional steps added, or with a combination of reordered, combined, omitted, or additional steps.

As illustrated in FIG. 8, at step 802, the process 800 may include applying an intake process based on received inventory data to applications, systems, and processes.

At step 804, the process 800 may include implementing a machine learning model in response to applying the intake process.

At step 806, the process 800 may include identifying areas of the potential bias data within the applications, systems, and processes by utilizing the machine learning model based on analyzing response data received during the intake process.

At step 808, the process 800 may include generating output data that includes bias data and exceptions data identified for the applications, systems, and processes.

At step 810, the process 800 may include mitigating the bias data and exceptions data in response to the output data by implementing a mitigation process.

According to exemplary embodiments, in implementing the machine learning model, the process 800 may further include generating algorithmic measurement data of biases in response to analyzing input data corresponding to the set of predefined criteria data; coding the algorithmic measurement data of the biases into a bias coding scanning tool; and scanning the coded algorithmic measurement data to identify the potential biases within the applications, systems, and processes.

According to exemplary embodiments, in the intake process, the process 800 may further include receiving the inventory data of a set of intake data and evaluation processes data corresponding to the application, systems, and processes within a plurality of organizations, wherein the machine learning model classifies each organization of the plurality of organizations into a level of maturity based on its ability to identify and mitigate biases in its applications, systems and processes. The process may further include certifying each application, system, and process within each organization of the plurality of organizations to a predefined level of maturity in relation to identified bias level and mitigation level corresponding to each of the application, the system, and the process.

According to exemplary embodiments, the BCSD 402 may include a memory (e.g., a memory 106 as illustrated in FIG. 1) which may be a non-transitory computer readable medium that may be configured to store instructions for implementing a BCSM 406 for automatic coding out biases in applications as disclosed herein. The BCSD 402 may also include a medium reader (e.g., a medium reader 112 as illustrated in FIG. 1) which may be configured to read any one or more sets of instructions, e.g., software, from any of the memories described herein. The instructions, when executed by a processor embedded within the BCSM 406 or within the BCSD 402, may be used to perform one or more of the methods and processes as described herein. In a particular embodiment, the instructions may reside completely, or at least partially, within the memory 106, the medium reader 112, and/or the processor 104 (see FIG. 1) during execution by the BCSD 402.

According to exemplary embodiments, the instructions, when executed, may cause the processor 104 to perform the following: applying an intake process based on received inventory data to applications, systems, and processes;

implementing a machine learning model in response to applying the intake process; identifying areas of the potential bias data within the applications, systems, and processes by utilizing the machine learning model based on analyzing response data received during the intake process; generating output data that includes bias data and exceptions data identified for the applications, systems, and processes; and mitigating the bias data and exceptions data in response to the output data by implementing a mitigation process.

According to exemplary embodiments, wherein in implementing the machine learning model, the instructions, when executed, may further cause the processor 104 to perform the following: generating algorithmic measurement data of biases in response to analyzing input data corresponding to the set of predefined criteria data; coding the algorithmic measurement data of the biases into a bias coding scanning tool; and scanning the coded algorithmic measurement data to identify the potential biases within the applications, systems, and processes.

According to exemplary embodiments, wherein during the intake process, the instructions, when executed, may cause the processor 104 to receive the inventory data of a set of intake data and evaluation processes data corresponding to the application, systems, and processes within a plurality of organizations.

According to exemplary embodiments, wherein the machine learning model classifies each organization of the plurality of organizations into a level of maturity based on its ability to identify and mitigate biases in its applications, systems and processes, and the instructions, when executed, may cause the processor 104 to certify each application, system, and process within each organization of the plurality of organizations to a predefined level of maturity in relation to identified bias level and mitigation level corresponding to each of the application, the system, and the process.

According to exemplary embodiments as disclosed above in FIGS. 1-8, technical improvements effected by the instant disclosure may include an improved platform/GUI for implementing a bias coding scanning tool/module for automatic coding out biases in applications, systems, and processes, but the disclosure is not limited thereto. For example, according to exemplary embodiments as disclosed above in FIGS. 1-8, the above-described problems associated with conventional approach may be overcome by implementing a bias code scanning/evaluation device/tool/module that may provide a platform for developing standards and frameworks via the bias coding scanning device/tool/module and a maturity model to safeguard organizational technologies against bias in coding and development processes, but the disclosure is not limited thereto.

Although the invention has been described with reference to several exemplary embodiments, it is understood that the words that have been used are words of description and illustration, rather than words of limitation. Changes may be made within the purview of the appended claims, as presently stated and as amended, without departing from the scope and spirit of the present disclosure in its aspects. Although the invention has been described with reference to particular means, materials and embodiments, the invention is not intended to be limited to the particulars disclosed; rather the invention extends to all functionally equivalent structures, methods, and uses such as are within the scope of the appended claims.

For example, while the computer-readable medium may be described as a single medium, the term "computer-readable medium" includes a single medium or multiple media, such as a centralized or distributed database, and/or associated caches and servers that store one or more sets of instructions. The term "computer-readable medium" shall also include any medium that is capable of storing, encoding or carrying a set of instructions for execution by a processor or that cause a computer system to perform any one or more of the embodiments disclosed herein.

The computer-readable medium may comprise a non-transitory computer-readable medium or media and/or comprise a transitory computer-readable medium or media. In a particular non-limiting, exemplary embodiment, the computer-readable medium can include a solid-state memory such as a memory card or other package that houses one or more non-volatile read-only memories. Further, the computer-readable medium can be a random access memory or other volatile re-writable memory. Additionally, the computer-readable medium can include a magneto-optical or optical medium, such as a disk or tapes or other storage device to capture carrier wave signals such as a signal communicated over a transmission medium. Accordingly, the disclosure is considered to include any computer-readable medium or other equivalents and successor media, in which data or instructions may be stored.

Although the present application describes specific embodiments which may be implemented as computer programs or code segments in computer-readable media, it is to be understood that dedicated hardware implementations, such as application specific integrated circuits, programmable logic arrays and other hardware devices, can be constructed to implement one or more of the embodiments described herein. Applications that may include the various embodiments set forth herein may broadly include a variety of electronic and computer systems. Accordingly, the present application may encompass software, firmware, and hardware implementations, or combinations thereof. Nothing in the present application should be interpreted as being implemented or implementable solely with software and not hardware.

Although the present specification describes components and functions that may be implemented in particular embodiments with reference to particular standards and protocols, the disclosure is not limited to such standards and protocols. Such standards are periodically superseded by faster or more efficient equivalents having essentially the same functions. Accordingly, replacement standards and protocols having the same or similar functions are considered equivalents thereof.

The illustrations of the embodiments described herein are intended to provide a general understanding of the various embodiments. The illustrations are not intended to serve as a complete description of all of the elements and features of apparatus and systems that utilize the structures or methods described herein. Many other embodiments may be apparent to those of skill in the art upon reviewing the disclosure. Other embodiments may be utilized and derived from the disclosure, such that structural and logical substitutions and changes may be made without departing from the scope of the disclosure. Additionally, the illustrations are merely representational and may not be drawn to scale. Certain proportions within the illustrations may be exaggerated, while other proportions may be minimized. Accordingly, the disclosure and the figures are to be regarded as illustrative rather than restrictive.

One or more embodiments of the disclosure may be referred to herein, individually and/or collectively, by the term "invention" merely for convenience and without intending to voluntarily limit the scope of this application to any particular invention or inventive concept. Moreover, although specific embodiments have been illustrated and described herein, it should be appreciated that any subsequent arrangement designed to achieve the same or similar purpose may be substituted for the specific embodiments shown. This disclosure is intended to cover any and all subsequent adaptations or variations of various embodiments. Combinations of the above embodiments, and other embodiments not specifically described herein, will be apparent to those of skill in the art upon reviewing the description.

The Abstract of the Disclosure is submitted with the understanding that it will not be used to interpret or limit the scope or meaning of the claims. In addition, in the foregoing Detailed Description, various features may be grouped together or described in a single embodiment for the purpose of streamlining the disclosure. This disclosure is not to be interpreted as reflecting an intention that the claimed embodiments require more features than are expressly recited in each claim. Rather, as the following claims reflect, inventive subject matter may be directed to less than all of the features of any of the disclosed embodiments. Thus, the following claims are incorporated into the Detailed Description, with each claim standing on its own as defining separately claimed subject matter.

The above disclosed subject matter is to be considered illustrative, and not restrictive, and the appended claims are intended to cover all such modifications, enhancements, and other embodiments which fall within the true spirit and scope of the present disclosure. Thus, to the maximum extent allowed by law, the scope of the present disclosure is to be determined by the broadest permissible interpretation of the following claims and their equivalents, and shall not be restricted or limited by the foregoing detailed description.

What is claimed is:

1. A method for coding out biases in applications, systems, and processes by utilizing one or more processors and one or more memories, the method comprising:
    implementing, by at least one processor, a bias code scanning module that includes a receiving module, an implementing module, an identifying module, a mitigating module, a generating module, a coding module, a scanning module, and a certifying module;
    applying, by calling the receiving module by a first application programming interface (API), an intake process based on received inventory data to applications, systems, and processes;
    implementing, by calling the implementing module by a second API, a machine learning model in response to applying the intake process;
    identifying, by calling the identifying module by a third API, areas of the potential bias data within the applications, systems, and processes by utilizing the machine learning model based on analyzing response data received during the intake process, wherein the potential bias data includes conscious or unconscious decisions data during development of the applications, systems and processes based on a set of predefined criteria data;
    generating, by calling the generating module by a fourth API, output data that includes bias data and exceptions data identified for the applications, systems, and processes; and
    mitigating, by calling the mitigating module by a fifth API, the bias data and exceptions data in response to the output data by implementing a mitigation process, and wherein in implementing the machine learning model, the method further comprising:
    generating, by calling the generating module by the fourth API, algorithmic measurement data of biases in response to analyzing input data corresponding to the set of predefined criteria data:
    coding, by calling the coding module by a sixth API, the algorithmic measurement data of the biases into the bias code scanning module;
    scanning, by calling the scanning module by a seventh API, the coded algorithmic measurement data to identify potential biases within the applications, systems, and processes;
    automatically coding out the potential biases in the applications, systems, and processes.

2. The method according to claim 1, wherein the set of predefined criteria data is selected from the group consisting of: race data, gender data, ability data, veterans' status data, language data, marital status data, zip code data, and location data.

3. The method according to claim 1, wherein the intake process includes receiving inventory data of a set of intake data and evaluation processes data corresponding to the application, systems, and processes within a plurality of organizations.

4. The method according to claim 3, wherein the machine learning model classifies each organization of the plurality of organizations into a level of maturity based on its ability to identify and mitigate biases in its applications, systems and processes.

5. The method according to claim 4, further comprising:
    certifying, by calling the certifying module by an eighth API, each application, system, and process within each organization of the plurality of organizations to a predefined level of maturity in relation to identified bias level and mitigation level corresponding to each of the applications, the systems, and the processes.

6. The method according to claim 1, further comprising:
    implementing, by the bias code scanning module, a user interface of a bias evaluation scanning tool, wherein the bias evaluation scanning tool is configured to receive user input via the user interface to assess performance and fairness of the applications, systems, and processes.

7. A system for coding out biases in applications, systems, and processes comprising:
    a processor; and
    a memory operatively connected to the processor via a communication interface, wherein the memory stores computer readable instructions that, when executed by the processor, causes the processor to:
    implement a bias code scanning module that includes a receiving module, an implementing module, an identifying module, a mitigating module, a generating module, a coding module, a scanning module, and a certifying module;
    apply, by calling the receiving module by a first application programming interface (API), an intake process based on received inventory data to applications, systems, and processes;
    implement, by calling the implementing module by a second API, a machine learning model in response to applying the intake process;
    identify, by calling the identifying module by a third API, areas of the potential bias data within the applications, systems, and processes by utilizing the machine learning model based on analyzing response data received during the intake process, wherein the potential bias data includes conscious or unconscious decisions data during development of the applications, systems and processes based on a set of predefined criteria data;

generate, by calling the generating module by a fourth API, output data that includes bias data and exceptions data identified for the applications, systems, and processes; and mitigate, by calling the mitigating module by a fifth API, the bias data and exceptions data in response to the output data by implementing a mitigation process, and wherein in implementing the machine learning model, the processor is further configured to:

generate, by calling the generating module by the fourth API, algorithmic measurement data of biases in response to analyzing input data corresponding to the set of predefined criteria data:

code, by calling the coding module by a sixth API, the algorithmic measurement data of the biases into the bias code scanning module;

scan, by calling the scanning module by a seventh API, the coded algorithmic measurement data to identify potential biases within the applications, systems, and processes; and automatically code out the potential biases in the applications, systems, and processes.

8. The system according to claim 7, wherein the set of predefined criteria data is selected from the group consisting of: race data, gender data, ability data, veterans' status data, language data, marital status data, zip code data, and location data.

9. The system according to claim 7, wherein during the intake process, the processor receiving inventory data of a set of intake data and evaluation processes data corresponding to the application, systems, and processes within a plurality of organizations.

10. The system according to claim 9, wherein the machine learning model classifies each organization of the plurality of organizations into a level of maturity based on its ability to identify and mitigate biases in its applications, systems and processes.

11. The system according to claim 10, wherein the processor is configured to:

certify, by calling the certifying module by an eighth API, each application, system, and process within each organization of the plurality of organizations to a predefined level of maturity in relation to identified bias level and mitigation level corresponding to each of the applications, the systems, and the processes.

12. The system according to claim 7, wherein the processor is further configured to:

cause the bias code scanning module to implement a user interface of a bias evaluation scanning tool, wherein the bias evaluation scanning tool is configured to receive user input via the user interface to assess performance and fairness of the applications, systems, and processes.

13. A non-transitory computer readable medium configured to store instructions for automatic coding out biases in applications, systems, and processes, wherein, when executed, the instructions cause a processor to perform the following:

implementing a bias code scanning module that includes a receiving module, an implementing module, an identifying module, a mitigating module, a generating module, a coding module, a scanning module, and a certifying module;

applying, by calling the receiving module by a first application programming interface (API), an intake process based on received inventory data to applications, systems, and processes;

implementing, by calling the implementing module by a second API, a machine learning model in response to applying the intake process;

identifying, by calling the identifying module by a third API, areas of potential bias data within the applications, systems, and processes by utilizing the machine learning model based on analyzing response data received during the intake process, wherein the potential bias data includes conscious or unconscious decisions data during development of the applications, systems and processes based on a set of predefined criteria data;

generating, by calling the generating module by a fourth API, output data that includes bias data and exceptions data identified for the applications, systems, and processes; and mitigating, by calling the mitigating module by a fifth API, the bias data and exceptions data in response to the output data by implementing a mitigation process, and wherein in implementing the machine learning model, the processor further performing:

generating, by calling the generating module by the fourth API, algorithmic measurement data of biases in response to analyzing input data corresponding to the set of predefined criteria data;

coding, by calling the coding module by a sixth API, the algorithmic measurement data of the biases into the bias code scanning module;

scanning, by calling the scanning module by a seventh API, the coded algorithmic measurement data to identify potential biases within the applications, systems, and processes; and automatically coding out the potential biases in the applications, systems, and processes.

14. The non-transitory computer readable medium according to claim 13, wherein the set of predefined criteria data is selected from the group consisting of: race data, gender data, ability data, veterans' status data, language data, marital status data, zip code data, and location data.

15. The non-transitory computer readable medium according to claim 13, wherein during the intake process, the instructions, when executed, cause the processor to receive inventory data of a set of intake data and evaluation processes data corresponding to the application, systems, and processes within a plurality of organizations.

16. The non-transitory computer readable medium according to claim 15, wherein the machine learning model classifies each organization of the plurality of organizations into a level of maturity based on its ability to identify and mitigate biases in its applications, systems and processes, and wherein the instructions, when executed, cause the processor to certify, by calling the certifying module by an eighth API, each application, system, and process within each organization of the plurality of organizations to a predefined level of maturity in relation to identified bias level and mitigation level corresponding to each of the applications, the systems, and the processes.

17. The non-transitory computer readable medium according to claim 13, wherein the instructions, when executed, cause the processor to perform the following:

implementing, by the bias code scanning module, a user interface of a bias evaluation scanning tool, wherein the bias evaluation scanning tool is configured to receive user input via the user interface to assess performance and fairness of the applications, systems, and processes.

\* \* \* \* \*